(12) United States Patent
Batachia et al.

(10) Patent No.: US 7,103,580 B1
(45) Date of Patent: Sep. 5, 2006

(54) NEGOTIATION USING INTELLIGENT AGENTS

(75) Inventors: Ion Leon Batachia, Bucharest (RO); Andrei Niculescu, Bucharest (RO); Adrian Amariei, Medford, MA (US)

(73) Assignee: Voxage, Ltd., Cayman Islands (KN)

( * ) Notice: Subject to any disclaimer, the term of this patent is extended or adjusted under 35 U.S.C. 154(b) by 0 days.

(21) Appl. No.: 09/539,651

(22) Filed: Mar. 30, 2000

(51) Int. Cl.
*G06F 17/60* (2006.01)

(52) U.S. Cl. ............................... 705/80; 705/1; 705/37; 705/400; 705/26; 705/35; 705/44; 706/46; 706/45; 706/60

(58) Field of Classification Search .................... 705/80, 705/26, 35, 1, 37, 400, 44; 706/45, 46, 60; 717/108, 116
See application file for complete search history.

(56) References Cited

U.S. PATENT DOCUMENTS 5,504,837 A * 4/1996 Griffeth et al. ............... 706/46
6,055,519 A * 4/2000 Kennedy et al. .............. 705/80
6,085,178 A * 7/2000 Bigus et al. ................... 705/80
6,141,653 A * 10/2000 Conklin et al. ............... 705/80
6,401,080 B1 * 6/2002 Bigus et al. ................... 705/37

FOREIGN PATENT DOCUMENTS

GB    EP 1 041 500 A2 *  4/2000

OTHER PUBLICATIONS

Negotiation functions for Autonomous Agents, Faratin, P; Sierra, C; Jennings, NR; Elsevier Science, Oct. 22, 1997.*

* cited by examiner

*Primary Examiner*—James P. Trammell
*Assistant Examiner*—C Owen Sherr
(74) *Attorney, Agent, or Firm*—Mintz Levin Cohn Ferris Glovsky and Popeo, P.C.

(57) ABSTRACT

A system and method for negotiating using intelligent agents is described. Using a scalable platform, a user can configure an agent to act on the user's behalf in bi-lateral or multilateral negotiations.

12 Claims, 9 Drawing Sheets end agent negotiation

NEGOTIATION USING INTELLIGENT AGENTS

FIELD OF THE INVENTION

The present invention relates to intelligent agent computer programs executable on computer systems.

BACKGROUND INFORMATION

Intelligent agent computer programs, also referred to as intelligent agents, software agents or simply agents, have become very popular in recent years. Simply put, agents may be considered to be software-implemented personal assistants with authority delegated from their users. Each agent is a computer program that, in appropriate circumstances, simulates a human relationship by performing something for a person that another person might otherwise do.

These human-delegated software entities can perform a variety of tasks for their human masters. They have been successfully used in helping people with time-consuming activities such as automating repetitive tasks or filtering information. Other conventional uses of intelligent agents include network management, mobile access management, messaging, adaptive user interfaces, etc.

An increasingly important application for intelligent agents is electronic commerce, promising a revolution in the field. Simply put, this means having agents that buy and sell goods and services on behalf of users. By exploiting the potential of the Internet and developing new capabilities for intelligent agents, the way we conduct transactions, whether business-to-business, business-to-customer, or customer-to-customer can be dramatically transformed. An agent may be configured to seek out other parties such as human users, computer systems, or other agents, and may conduct negotiations on behalf of their owners, even entering into commercial transactions.

Intelligent agents operate with varying degrees of constraints depending upon the amount of autonomy that is delegated to them by the user. Agents display their intelligence differently; some by being creative, some by being crafty and elusive (worms and viruses), some by being helpful (personal assistants and surrogate bots), and still others by being resourceful in their own ways (for example, teaching agents). The "intelligence" is generally the amount of reasoning and decision making ability that an agent possesses. Agents can use different means to achieve intelligence; some adopt heuristics, some use constraints, some depend on knowledge databases, and yet others learn from experience. This intelligence can be simple (following a predefined set of rules), or complex (learning and adapting based upon a user's objectives and both the user and agent's resources).

Generally speaking, the level of intelligence or sophistication that an intelligent agent could ultimately demonstrate is limited more by user-agent trust than by any limitations of artificial intelligence technology. In order for these agents to be widely accepted, it is crucial that the agent's behavior be easily understood and controlled by the user.

One of the promising areas of application for intelligent agents is negotiation. Adding negotiation capability to an intelligent agent is a challenging task. Negotiation is a form of decision-making where two or more parties jointly search a space of possible solutions with the goal of reaching a consensus. There are two types of negotiation: competitive and cooperative.

Competitive negotiation can be described as the decision-making process of resolving a conflict involving two or more parties over a single mutually exclusive goal. This situation is described differently in the economics and game theory literature. Economics describes competitive negotiation as the effects of the market price of a limited resource given its supply and demand among self-interested parties. In game theory, the same situation is described as a zero-sum game where a shift in the value along a single dimension in either direction means that one side is better off and the other is worse off. Thus, the self-interest of a party in negotiation may be captured by a utility function. In the negotiation process, one party tries to maximize his or her utility, and the behavior of a party in any moment of negotiation is decided by an established strategy.

Cooperative negotiation can be described as the decision-making process of resolving a conflict involving two or more parties over multiple interdependent, but non-mutually exclusive goals. The game theory literature describes cooperative negotiations as a non-zero sum game where as values along multiple dimensions shift in different directions, it is possible for all parties to be better off.

Of the multitude of potential uses of intelligent agents with negotiation capabilities, electronic commerce is one of the most important. The traditional activity for buying and selling in its known forms, business-to-business, business-to-customer, or customer-to-customer, is time-consuming and often includes steps such as negotiating on price and other features. The effective use of software agents negotiating in electronic market places can dramatically reduce the transaction costs for all involved in electronic commerce. For example, dynamically negotiating a price instead of fixing it relieves the seller from needing to determine the value of the good a priori; negotiation pushes this burden into the marketplace itself. Another benefit of negotiation is that limited resources are allocated fairly—to those buyers who value them most.

When building an autonomous or semi-autonomous agent which is capable of flexible and sophisticated negotiation, in general the following need to be considered:

1. What is the object of the negotiation, and over which features of the object will negotiation takes place?
2. What negotiation protocol will be used?
3. What reasoning model will the agents employ?

In the case of agent-to-agent negotiation, the agents should use the same ontology and should agree on the issues over which negotiation takes place. They should use the same established language and should follow the same rules or legitimate actions when interacting each other, namely the same protocol.

Every agent must take into account the goals, the constraints on what it is authorized and not authorized to do, and the parameters influencing its behavior that have been established by the client for whom it negotiates. Depending on its degree of delegated autonomy and its strategy, the agent may adapt its behavior in negotiation to the changing conditions of the environment.

When established a partner for negotiation an agent should be able to determine what initial offers should be sent out, what is the range of acceptable agreements, what counter offers should be generated, when an agreement is reached and when negotiation should be abandoned. All these may be part of a reasoning model of an agent.

There are also some important aspects that should be taken into account when designing intelligent agents with negotiation capabilities, to enable them to operate reliably, efficiently and profitably on behalf of their clients. This is especially important in competitive negotiations.

Privacy of the information is one important requirement that should consider carefully. To operate reliably and profitably on behalf of their clients, agents should keep information related to their constraints or strategy used in negotiation hidden from the other parties. Otherwise the agent (and implicitly its client) is placed at a competitive disadvantage.

One desirable characteristic (especially in electronic commerce applications) for intelligent agents is that of efficiency. Agents should try to maximize the number of deals at the best conditions (price, utility value, etc.) for their clients. One related aspect is the time spent in negotiation. The time spent negotiating should be reasonable with respect to the value of the agreement—the agents should not become involved in unnecessarily complex and time-consuming negotiations.

The reasoning model followed by the agent should be powerful. However, at the same time it is very important that the agent's behavior can easily be understood and controlled by the user. Otherwise, a sophisticated agent can never be widely accepted. A general challenge facing agent design is that of making sure that the agent lives up to the user's expectation.

SUMMARY

The present invention addresses these and other problems associated with the prior art in providing intelligent agents with negotiation capabilities.

In accordance with an example embodiment of the present invention, a negotiation system is provided for multilateral negotiations about a set of variables or components forming the negotiation object. The components represent objects (called sub-objects) or attributes. In a recursive manner, a negotiation object may be refined in sub-objects and attributes. At the lowest level, the components represent only attributes. The attributes may be quantitative (e.g. price, duration, quantity) or qualitative (e.g. the nature of the contract negotiated). For every agent, the quantitative attributes are defined over a real domain representing the ranges of values acceptable to the respective agent. The qualitative attributes are defined over a fully ordered domain.

The multilateral negotiation is transformed in separated bilateral negotiation threads. On each negotiation thread, the negotiation may be iterative with several rounds of offers and counter-offers occurring before an agreement is reached or the negotiation is terminated for other reasons. Once the agents have determined the set of issues over which they will negotiate, the negotiation process between two agents consists of an alternating succession of offers and counter-offers of values of variables representing these issues. The iteration continues until the other side accepts a counter-offer, or until one of the partners terminates negotiation (e.g., because a time deadline is reached without an agreement being in place).

The main decisions faced by agents in negotiation are a combination of evaluatory decisions and offer generation decisions. The evaluatory decisions include assessments such as: i) whether the opponent's offer is unacceptable for the time being but there is still room to keep the negotiation going, ii) whether the opponent's offer is acceptable and an agreement is reached, iii) whether negotiation should be abandoned, etc. The offer generation decisions include assessments such as: i) what initial offer should be generated, and ii) what counter offer should be given in situations where the opponent's offer is unacceptable. The agent architecture captures a solution to these decision problems.

A third party, acting as an electronic mediator, may be also part of the negotiation environment. This component may intervene in the multilateral negotiations and may have complex and multiple roles. For instance, the mediator can play the role of a broker (bringing the parties together, identifying potential bargaining pairs, matching up a suitable buyer and seller). The role of the mediator may also include providing an unbiased environment for opponent agents (such as the same rights in accessing common information, the same logical and physical conditions), keeping the negotiation going by suggesting new alternatives to follow, when recognize that there are no chances for the opponents to make a deal.

In one example of the present invention, the software platform for negotiations may be accessed using the Hypertext Transfer Protocol ("HTTP") protocols, wireless application protocol ("WAP"), and any other Internet-enabled protocol or standards of interconnectivity, and provides an appropriate environment for multi-component negotiation through intelligent agents acting on behalf of their users. The purpose of each negotiation is to reach an agreement about the provision of a service of a product by one agent for another. The delegated agents are configured and started by users, and have a high degree of self-determination in deciding for themselves what, where, and under what conditions their actions should be performed. The negotiation involves determining a contract under certain terms and conditions; the agents try to obtain a contract in the most favorable terms and conditions for their clients.

Other aspects of the present invention related to the user-centered approach to establishing the overall strategy of the agent in negotiation. The object is to provide the agent with a configurable behavior, easily understood and controlled by the user, without introducing a high level of complexity, but at the same time, directed towards efficiency in negotiation.

DETAILED DESCRIPTION

Negotiation Model

In accordance with the example embodiment of the present invention, each negotiation agent can adopt one of two, possibly conflicting, roles: a buyer or a seller. The system provides multilateral negotiation capabilities between buyer agents and seller agents over a negotiation package (of services or goods) consisting of many issues. However, multilateral negotiations can also be described as a series of bilateral negotiations.

Figure 1A:
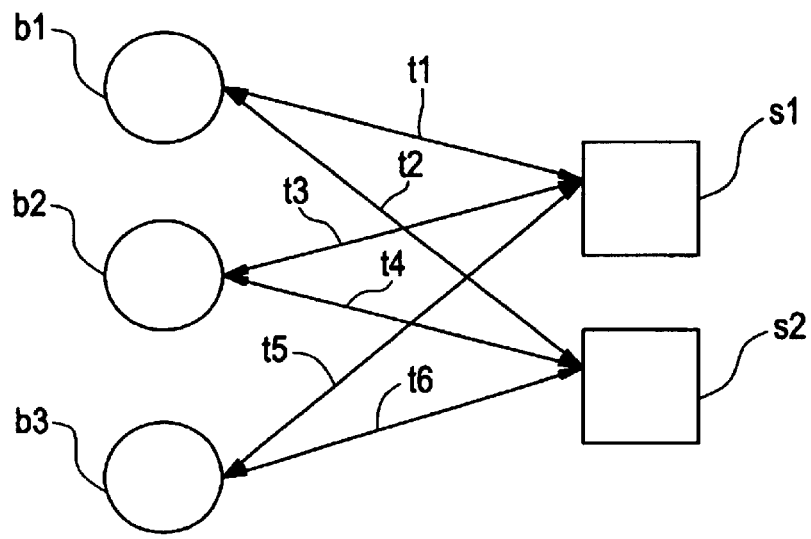
FIG. 1a shows a first representation of multilateral negotiations.
Figure 1B:
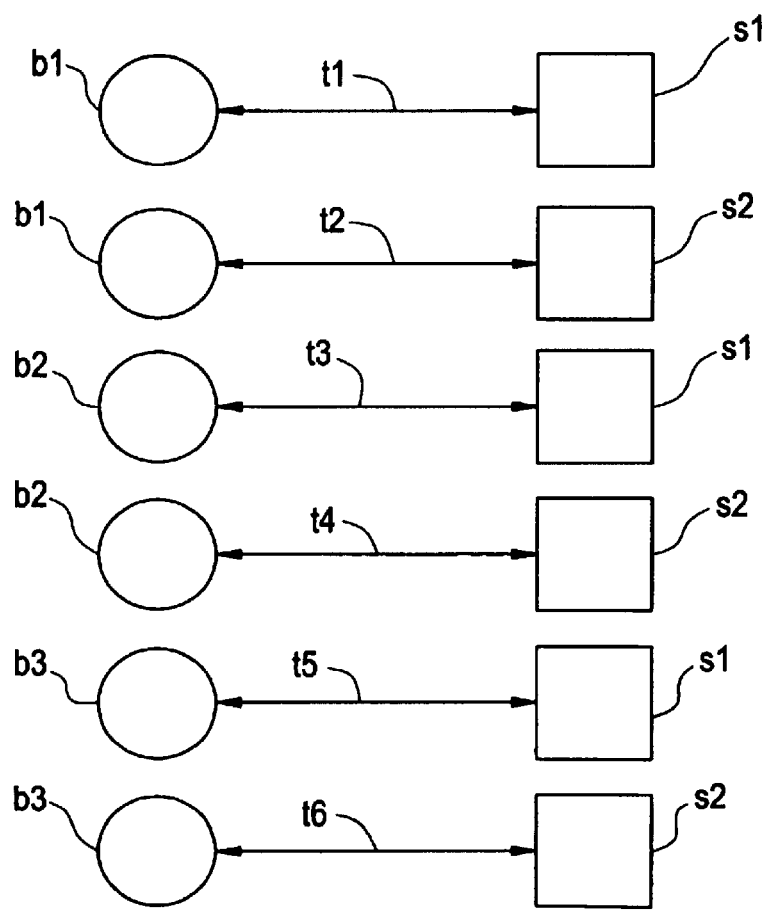
FIG. 1b shows a second representation of multilateral negotiations.

FIG. 1*a* shows two different sellers S1–S2 and three different buyers b1–b3 in multilateral negotiations. Each bilateral negotiation is processed as a negotiation trend t1–t6. FIG. 1*b* shows an equivalent representation of these negotiations.

Figure 2:
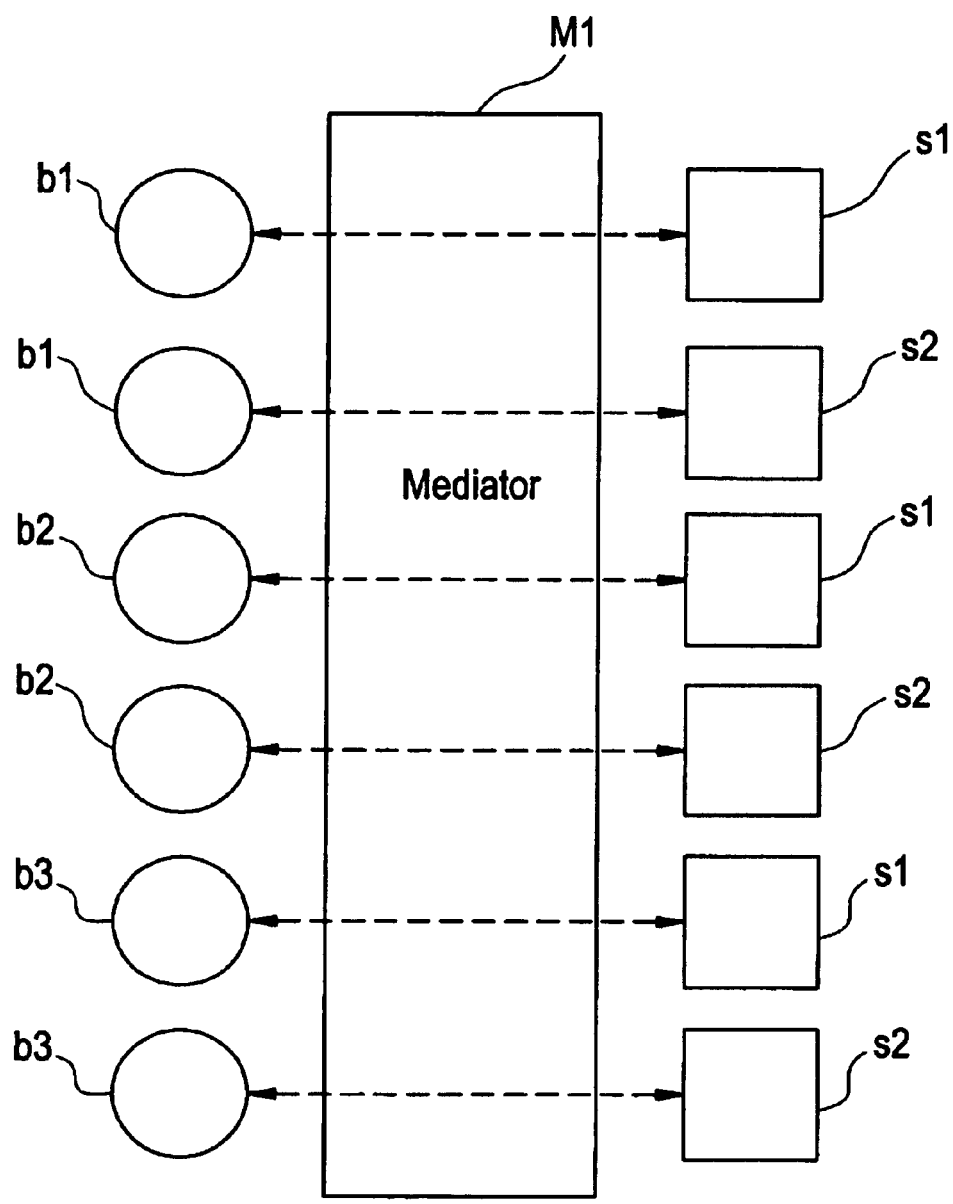
FIG. 2 shows communication between sellers and buyers via a mediator.

Communication between each of the sellers s1–s2 and buyers b1–b3 may be established directly. However, in accordance with the example embodiment of the present invention, the communication is established through a mediator M1, as shown in FIG. 2. In one embodiment of the present invention, the mediator M1 may simply bring sellers and buyers together, and may configured as a simple channel. However, in another embodiment, the mediator M1 may supervise the communication between sellers and buyers, and may supervise a created market (e.g., an "electronic market"), etc.

The architecture for seller and buyer agents is based on mechanisms for the evaluation of the offers (in order to decide when an opponent offer is acceptable or not) and mechanisms for generating offers at each step of the negotiation.

The minimal protocol for a bilateral negotiation may be extremely simple. For example, Starting from the initial offer (made by any one of the parties) to the end of the negotiation (successfully or not), one party's offer is followed by the other party's counter-offer. The duration of the negotiation is limited by established deadlines. The parties involved in negotiation may have different deadlines. After sending an offer, one party may not send another offer until a response is received from the other party (directly or by means of the electronic mediator). A minimal language used in agent interactions contains the following primitives: OFFER, EXIT, ACCEPT. Of course, many other messages may be used to increase the flexibility, efficiency, and/or reliability of the agent negotiation.

An OFFER is sent by an agent in two circumstances: either to initiate a negotiation thread by sending a first offer, or to respond to a counter-offer sent by an opponent. In the second case, the opponent's offer was unacceptable but the agent still has time to keep the negotiation going. The nature of the offer is controlled by the established strategy in generating offers.

An EXIT is sent by an agent to close a negotiation. The message is sent when the agent's deadline has been reached, after an agreement is reached, or when the agent has been instructed to stop negotiating (for example, if the user chooses to intervene and stop a negotiation).

An ACCEPT is sent by an agent when the opponent's offer is acceptable. An offer is accepted when the opponent offer is better in terms of the agent's utility than its current generated counter-offer. Receiving or sending this message completes a bilateral negotiation successfully.

When the user creates an agent and delegates his/her authority to negotiate, the user must first establish all the necessary elements that define the agent's task and behavior. The user can then start the negotiation. Depending on the nature of the delegated authority, the user may then intervene during the negotiation to change the strategy, set constraints, stop the negotiation, etc.

Figure 4:
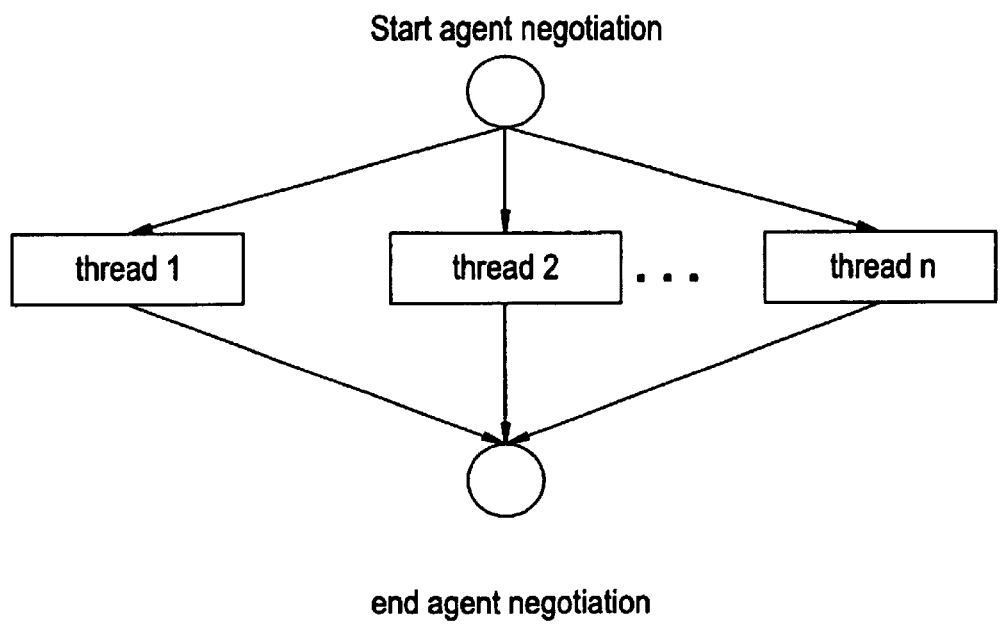
FIG. 4 shows an agent simultaneously negotiating with n agents during a period of time from the start time to the established deadline.

FIG. 4 shows a situation where the agent simultaneously negotiates with n agents during a period of time from the start time to the established deadline (though the user may intervene to stop the negotiation at any time). The negotiation is executed in n different threads. The opponent agents may be agents already present in the electronic market when the agent is delegated to negotiate, or may be newcomers arriving in the market during the time interval of the negotiation.

Figure 5:
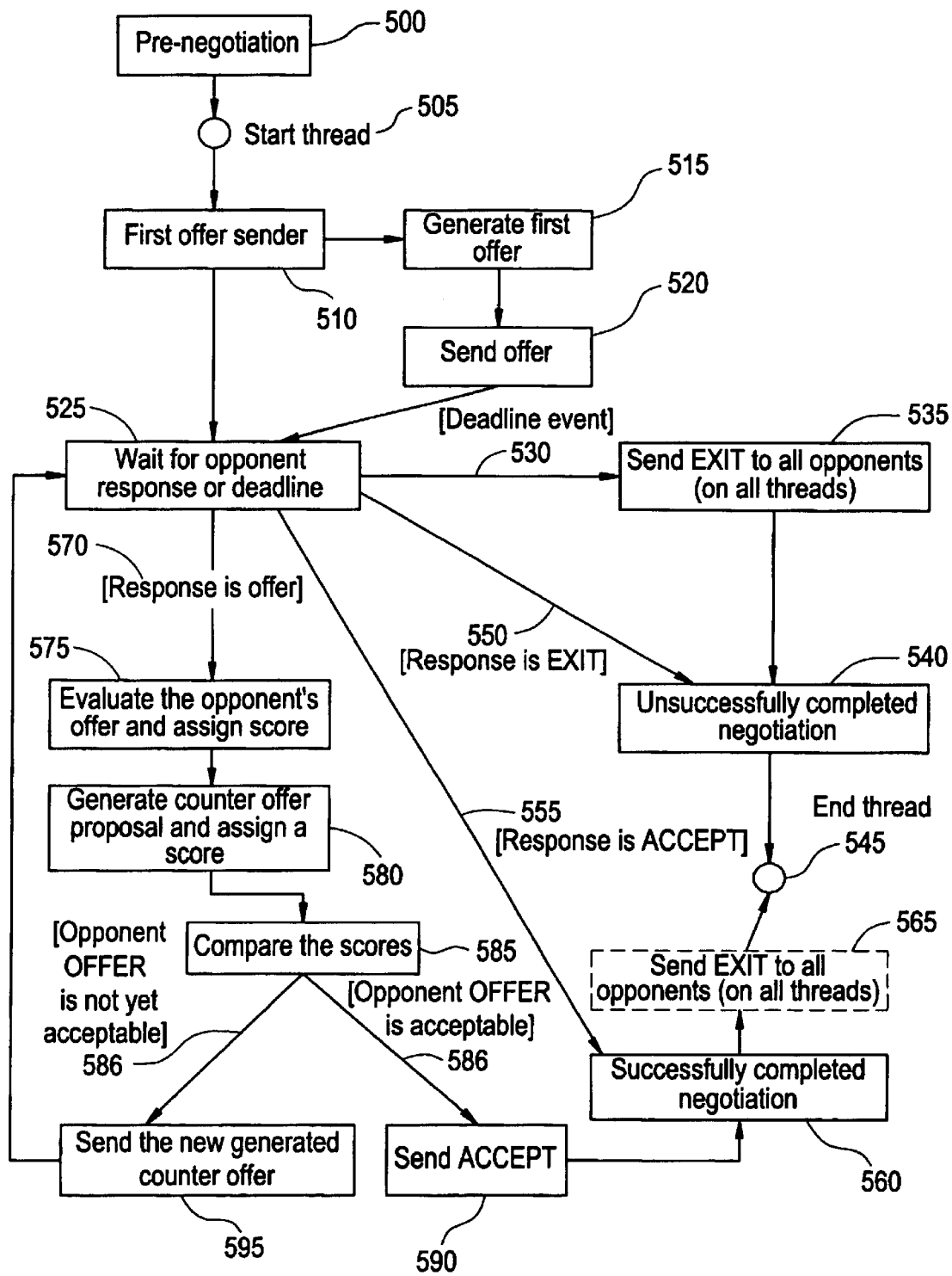
FIG. 5 shows example states and message exchanges of an agent in a particular negotiation thread with another agent.

FIG. 5 presents example states and message exchanges of an agent in a particular negotiation thread with another agent. This particular example is applicable to both buyer and seller agents.

Before starting the negotiation, a pre-negotiation stage may be necessary (500). The product or service package under negotiation has a set of issues that make part of a common ontology. The pre-negotiation stage may establish which issues be part of any offer and which are optional. Other preparations or updates may be the object of this stage too. For instance, in this stage, previously established behavior, constraints, intervals of acceptability for offers, etc. may be updated in order to take into account the particular partner in negotiation or the overall strategy in negotiation. In one embodiment of the present invention, a user may, via a user interface (through, for example, a browser) configure a buyer agent for negotiation. The user may be required to select the package the user desires to buy from a list of packages each one containing goods or services. Once the particular package is chosen, the negotiable terms or components of the negotiation are established. For example, if the user wishes to buy a particular make and model of a car, the price, term of warranty, color, options, etc. may be negotiable. If the user wishes to subscribe to a wireless telephone service, price per minute, monthly connect charges, and the number of free minutes, etc. may be negotiable.

For each package, an indication of the negotiable components may be stored in a central database. For each of the negotiable components, the user may select, for example, intervals, strategies, limits and an indication of relative importance of each component. In the case of a car, for example, the user may select: i) a price range, e.g., [$0–$35000], ii) a warranty duration range [8 years–3 years], iii) a color, e.g., any of [red, white, blue], necessary options [air conditioning, power steering, passenger-side airbags], etc. The user may be willing to negotiate for 48 hours. If the case of wireless services, the user may select, for example, i) a price-per-minute range [$0.0–$0.05], ii) a connect change range [$0.0–$19.95] per month, and iii) a free minute range of [500 minutes–100 minutes].

Seller agents may be similarly configured. For example, if a car manufacturer wishes to establish a seller agent, the car manufacturer may select: i) a price range, e.g., [$45,000–$29,000], a warranty duration range [2 years–5 years], iii) colors available any of [red, black, yellow], and options

[air conditioning, tinted windows]. The car manufacturer may be willing to negotiate with this configuration of 4 weeks. If a wireless service provider wishes to establish a seller agent, the wireless service provider may select, for example, i) a price-per-minute range [$0.10–$0.03], ii) a connect charge range [$45.00–$15.00] per month, and iii) a free minute range of [0 minutes–250 minutes].

After the pre-negotiation stage, the mediator may match buyer and seller agents. For example, the mediator would match a buyer agent of a user wishing to purchase a car with a seller agent of an automobile manufacturer. Also, the mediator would match an agent of a buyer wishing to obtain wireless services with a seller agent of a wireless services provider. In one embodiment, the mediator has access to the profiles of all agents, and thus can easily determine appropriate buyer agent/seller agent matches.

The negotiation thread may be started by any party (505). The first offer sender may be chosen by a third party having the role of the mediator, based on different criteria. For instance, a very simple and natural criterion may be the creation date of the agent. In this case, the more recently created agent could be in charge of sending the first offer (510, 515, 520).

Once the offer is sent, the agent (either buyer or seller) waits either for an opponent's response or for negotiation time to expire, i.e., a deadline event (525). In the event of a deadline of the agent (530), the agent sends an EXIT to all opponents (535), indicates an unsuccessful negotiation (540), and ends the thread (545).

If the agent instead receives an EXIT (i.e., the opponent on this thread is terminating the negotiation) (550), the agent indicates an unsuccessful negotiation (540), and ends the thread (545).

If the agent receives an ACCEPT from the opponent on this thread (555), the agent indicates a successful negotiation (560), optionally send an EXIT to all other opponents on all other threads (e.g., if the agent is willing to enter into only one contract)) (565), and ends the thread (545).

Alternatively, if the agent receives an OFFER (i.e., either an offer or a counter-offer) (570), the agent evaluates the opponent's offer (575). According to the example embodiment of the present invention, in order to evaluate an opponent's offer, a scoring or utility function is utilized. The goal of a delegated agent is to maximize its scoring function in negotiation. The scoring function may be modeled in various ways. A simple and natural way is to assign a scoring function for each of the components of the negotiation package and model the overall scoring function as a linear or non-linear combination of the components scoring functions.

Figure 3:
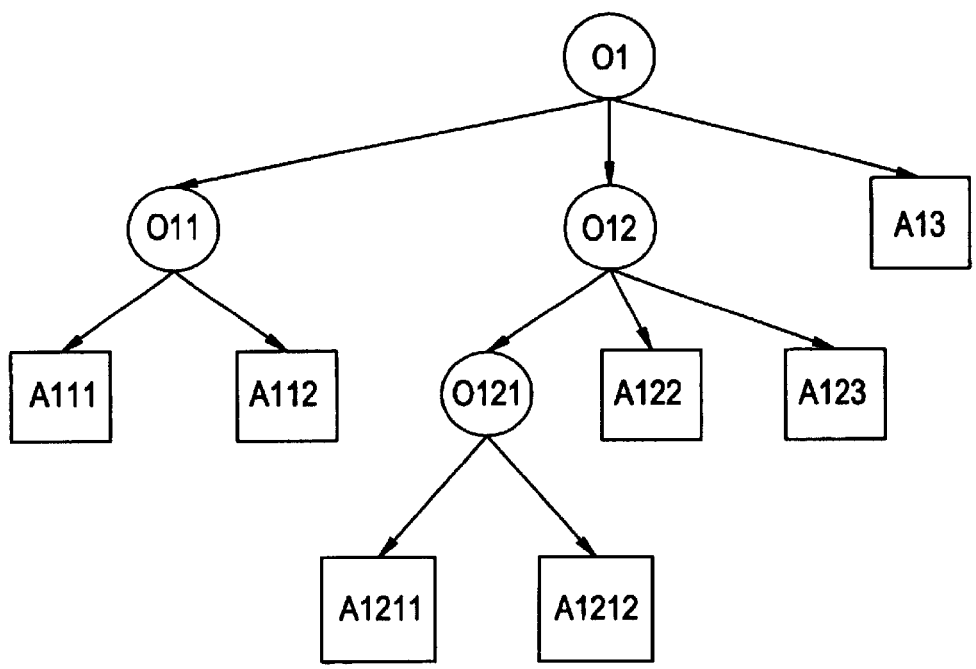
FIG. 3 shows an example of a negotiation package structure

In accordance with the example embodiment of the present invention, the negotiation package (or negotiation object) represents a structure that can be broken down into many components. Each component of the negotiation object represents a sub-object or an attribute. A negotiation sub-object is also composed of sub-objects and attributes. At the lowest level, the negotiation components represent only attributes. These components and the relations between them can be viewed as a tree, with the negotiation package representing the root and other non-terminal nodes representing sub-objects at different levels. The terminal nodes of the tree are qualitative or quantitative attributes that characterize and compound their more complex sub-object parents. FIG. 3 shows an example of a negotiation package structure, where the object O1 is refined in the sub-object components O11, and O12, and the attribute component A13. The sub-objects are further refined in their components. The terminal nodes, which cannot be further refined, are represented by the attributes A113, A111, A112, A122, A123, A1211, A1212.

Attributes may be quantitative (e.g. price, duration, quantity) or qualitative (e.g. the nature of the contract negotiated). For every agent, quantitative attributes are defined over a real domain representing the ranges of values acceptable to the respective agent. The qualitative attributes are defined over a fully ordered domain.

More formally stated let a and b represent the opponent agents in a negotiation, $A=\{1,\ldots,n\}$ representing the set of all its attributes (all the terminal nodes in the tree describing the negotiation package). The domain for an attribute $j \in A$ for an agent $i \in \{a, b\}$ is defined as $D=[min, max]$ when j is an quantitative attribute and $D=<q_1, \ldots, q_n>$ when j is a qualitative attribute with the $q_1, \ldots, q_n$ being its ordered possible values.

Each agent $i \in \{a, b\}$ has a scoring function associated to one attribute j:

$$S:[min, max] \qquad (1)$$

which gives the score the agent assigns to a value of attribute j in the range of its acceptable values. For convenience, the scores may be kept, for example, in the interval [0, 1], with 0 for the worst value and 1 for the best value, with attribute values outside the interval of acceptability scored as 0. Simple scoring functions are used which may be either monotonically increasing or decreasing, though other approaches may be also followed in a particular implementation. These examples show simple scoring functions defined for a quantitative attribute j:

$S(x_j)=(xj-min_j)/(max_j-min_j)$, where xj represents the value in a given offer for an increasing attribute j (i.e. the agent has interest to obtain in negotiation a high value for it). Typical example is the price in the seller case.

$S(x_i)=1-(xi-min_i)/(max_i-min_i)$, where xj represents the value in a given offer for an decreasing attributed j (i.e. the agent has interest to obtain in negotiation a low value for it). Typical example is the price in the buyer case.

The next element to consider is the relative importance that an agent assigns to each issue (sub-object or attribute) under negotiation. W is the importance of issue j for agent i. The weight associated with each issue is defined for each agent at the beginning of the negotiation, but can be changed later on in the negotiation (by external causes, the agent's interests, human intervention, inference based on a set of business rules, specified transition functions for the weights or for the overall behavior, etc.). Considering the negotiation package as a tree with sub-objects represented as non-terminal nodes and attributes of the parent sub-objects represented as terminal nodes, we assume that the weights related to the decomposition of a particular sub-object in a tree for both agents are normalized at any moment t i.e.

$$w^i_j(t)=1, \qquad (2)$$

for i in $\{a,b\}$, $j=1,\ldots n$ being the component of a particular sub-object in a tree.

When an agent a receives an offer, it rates the overall contract value using a function that combines the scores of the different components. The value assigned to a sub-object is compounded of the scoring of its components (attributes or sub-objects) and the overall scoring is obtained in a recursive manner starting from the root of the tree. Different composition functions may be used. A simple example may be that of an additive scoring function:

$w^i_j(t)s^i_j(x_j)$, where $w^i_j(t)$ is the importance of the component j, $x_j$ is its value (obtained from the scorings of its sub-components) of a particular sub-object for agent i at time t. The scoring of an attribute is obtained by taking into account its value and its assigned scoring function.

Using an assigned scoring function, the agent is able to evaluate the offers it receives and the offers and counter-offers it proposes to the partners. The offers and counter-offers it proposes may be generated in a number of ways. One conventional example of a mechanism to generate offers and counter-offers is the concession mechanism, which is briefly presented here. In this mechanism, offers are generated that have successively lower scores than the previous offers, in accordance with the configurable behavior. Other natural mechanisms (inspired by real life negotiations) are trade-offs mechanisms and component set manipulation mechanisms. In these two mechanisms, agents construct new offers without necessarily losing scores in the successive offers. In the trade-off mechanism, one of the two negotiating parties lowers its score on some attributes and simultaneously demands more on other attributes. In the component set manipulation mechanism, the set of components of the negotiation structure may be altered dynamically during the negotiation. Negotiation processes are directed and centered over a subset of components called required components. The set of required components is established in the pre-negotiation stage and cannot be altered (i.e. this set must be present in any offer, or counter-offer). However, the non-required set can be altered dynamically. These mechanisms or others may be used in combination to generate offers and counter-offers.

Regardless of the mechanism implemented according to the example embodiment of the present invention, the agent uses the same method to decide to accept an offer or to propose a new counter-offer. Referring again to FIG. 5, when the agent receives an offer (570), the agent evaluates it (575), and then generates the counter-offer it intends to propose in accordance with the particular mechanism that it has implemented (580). The agent then evaluates the generated counter-offer. If the score of the received offer is greater or equal than the score of the offer it intend to propose (585, 586)), the agent may accept the offer and send an ACCEPT message to the opponent agent (590), thus successfully completing the negotiation thread (560). Otherwise, the agent proposes the new generated counter-offer (587, 595). When an agent is interested in obtaining only one contract agreement, the agent sends an EXIT message to all the other negotiation partners after it successfully terminates a negotiation thread (565). Otherwise, the agent continues to negotiate in the other threads until the established deadline or until another agent event causing the end of negotiation, for example user intervention, no negotiation partners left in the market, etc. This would be the case for a seller, for example, whose concrete strategy and the number of agreements it intends to obtain depends also on the quantity of goods or services it has in stock.

The mechanism for generating offers is a general one, in order to cover a very large set of implementation solutions. Various functions in combination and/or predefined set of rules may be used to generate offers and counter-offers. For a single component of the negotiation object using a single criterion (e.g. time remaining, resources remaining, the behavior of the opponent agent, etc.), these specific functions (or tactics) are used to generate an offer or counter offer. If multiple criteria are important in determining the value of a negotiation issue, then multiple functions can be applied to the issues, assigning weights to indicate their relative importance. To achieve flexibility in negotiation, the agent (or the owner of the agent) may wish to change their ratings of the importance of the criteria over time. The specific tactics describing the agent behavior related to specific criteria or environmental events depend on parameters that may be dynamically modified through specified transition functions, through user interventions during the negotiation, or as a result of inference based on a set of rules. Also, the weights representing the relative importance of the tactics in expressing the overall behavior of the agent may be dynamically altered in order to provide a more flexible behavior or to better hide from other parties the strategy used in negotiation.

The term strategy is used to denote the way in which an agent changes its behavior over time in response to various environmental and negotiations cues.

There is a multitude of tactics that may be used alone or in combination to model a specific behavior. In a specific implementation of a negotiation environment, a library of such kind of functions may be available to allow the user to construct the desired behavior for delegated agent(s). A user-centered approach may allow him or her to customize interactively the functions that describe the behavior of the delegated agents relative to the different components of the negotiation package.

The model briefly presented does not always guarantee convergence for a negotiation, but in practice the existence of time deadlines ensures that the negotiations will be terminated, if not always successfully.

These examples describe types of tactics that can be used in modeling a concessive behavior:

Time-dependent Tactics

If an agent has a time deadline to reach an agreement, such tactics model the fact that the agent is likely to concede more rapidly as the deadline approaches. The shape of the curve of concession, which is a function depending on time, is what differentiates these tactics.

Resource-dependent Tactics

These tactics model the pressure in reaching an agreement that limited resources (such as remaining bandwidth to be allocated, money, etc.) and the environment (such as the number of buyers, the number of sellers, or other economic parameters) impose upon an agent's behavior. The functions in this set are similar to the time-dependent functions; however, the domain of the function is the quantity of resources available, not the remaining time.

Behavior-dependent Tactics (Imitative Tactics)

In this case the counter-offer of an agent depends on the behavior of the negotiation opponent. These tactics are also called imitative tactics, and they differ in which aspect of their opponent's behavior they imitate and to what degree the opponent's behavior is imitated.

One problem that should be handled carefully, especially in the electronic environment created for competitive negotiations between intelligent agents, is the security and privacy of information. In the example embodiment of the present invention, the created electronic environment for negotiation does not disclose the agent strategy in generating offers and counter-offers, agent constraints, or any other private information to other parties without its agreement. The architecture of the electronic market should assure its neutrality. No party involved in negotiation should be at a competitive advantage in relation to its opponent(s). The privacy issue can be addressed through the action of the mediator, intervening as a third party in the negotiation. In agent negotiation, the roles of such a software component could be quite complex. For example, the mediator may play the role of a broker (bringing the parties together, identifying potential bargaining pairs, matching up a suitable buyer and seller). The mediator might also act to provide an unbiased environment for opponent agents, ensuring that they have the same rights in accessing common information, the same logical and physical conditions, etc. Being in the middle of the negotiations, the mediator can track them and log important data to be used in relevant statistics. Having access to confidential information, the electronic mediator can recognize that there are no chances for the opponents to make a deal and can notify them. In such a situation it may also seek and suggest new alternatives to follow for the parties, restarting the negotiation and contributing to an increased number of successful negotiations.

Example Negotiation System

In accordance with one embodiment of the present invention, the negotiation model described above is integrated in a scalable software platform, such as, for example, an Internet negotiation service for different subscribers interested in negotiations using intelligent agents. These subscribers may be individual customers or business customers that intend to sell or buy goods or services. The interconnectivity capabilities offered also allow other applications to connect to the negotiation platform.

Figure 6:
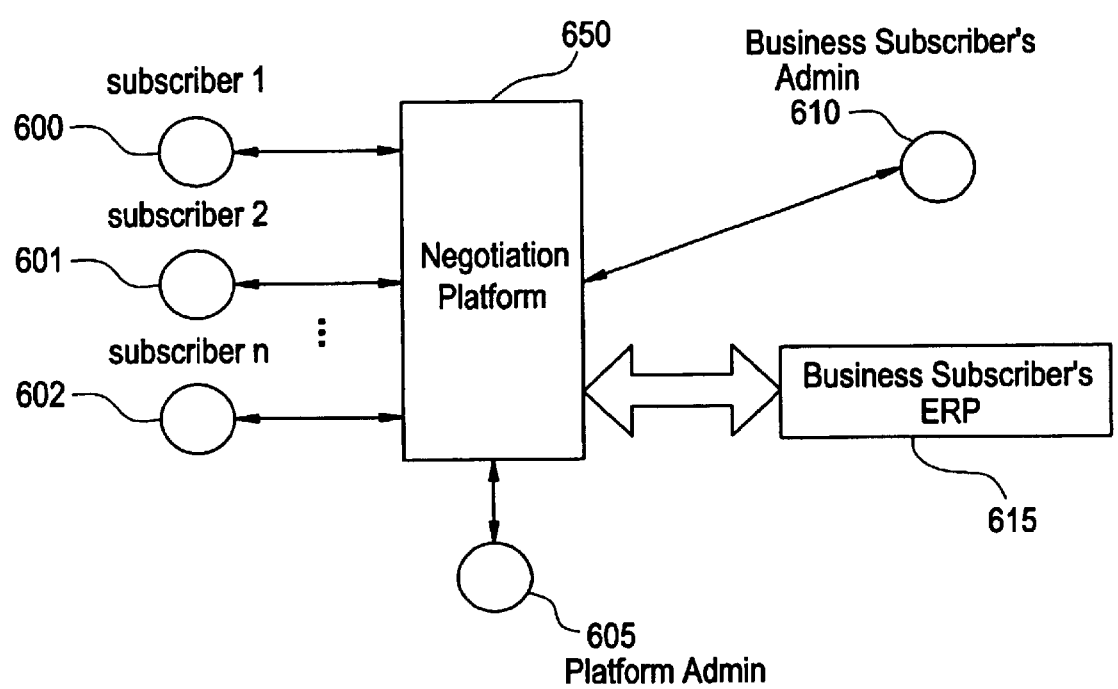
FIG. 6 illustrates one embodiment of the present invention.

FIG. 6 illustrates one embodiment of the present invention. In addition to the usual subscribers 600–602, administrators 605, 610 may also access the platform 650. In this embodiment, a platform administrator 605 appropriately configures the runtime parameters of the system to assure an acceptable level of performance, and also manage user registration in the system. The platform administrator 605 can monitor the status of the platform whenever he/she enters the platform (the number of active sessions, the number of active negotiation threads, the processor(s) and network loading, memory usage, etc.). Other responsibilities of the platform administrator 605 may be related to supervising the correct registration (in terms of the common ontology used) of the products or services that will be the subject of future negotiations between seller and buyer agents.

Individual subscribers (buyers or sellers) 600–602 to the platform 650 are able to manage the personal data that forms their own static profiles, and to configure their delegated agents negotiation behavior, in terms of goals, constraints, and strategy. For business subscribers, designated administrators (e.g., 610) manage the profiles of the respective companies and the configuration of their agents (e.g., 615).

Figure 7:
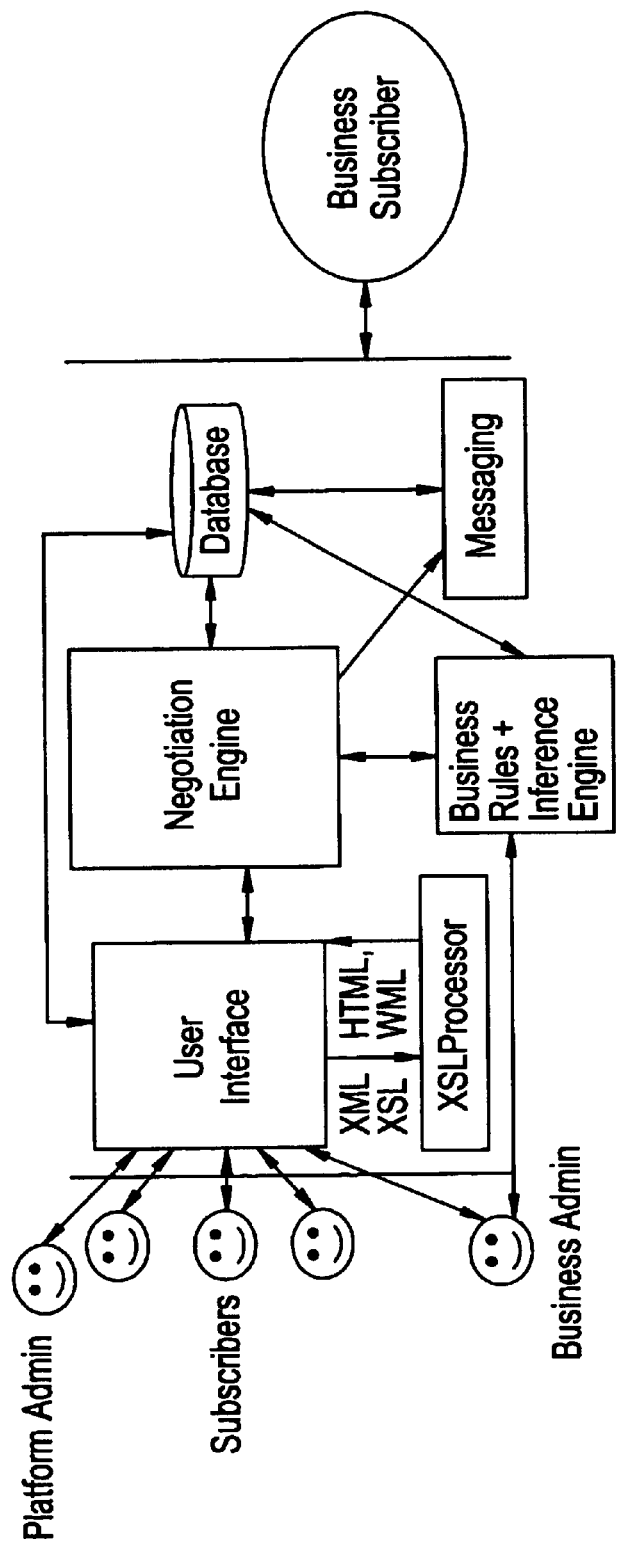
FIG. 7 shows one possible architecture for the system according to the present invention which offers multiple ways to connect to the provided services.

FIG. 7 shows one possible architecture for the system according to the present invention which offers multiple ways to connect to the provided services. One possible way to connect to the platform is through a hypertext markup language ("HTML") interface (via HTTP). For subscribers possessing global system for mobile communication ("GSM") phones, another interface possibility is the wireless markup language ("WML") (via WAP). The applications may connect to the described platform through the Internet, via Extended Markup Language ("XML") or Common Object Request Broker Architecture ("CORBA") standards. Thus, businesses that intend to use the services of the described environment can easily connect to it through their specific applications or integrate it seamlessly into their information systems.

The electronic market that is created may be dedicated to a specific industry or may be a more general one where different products or services from various industries are marketed. Wwhether business-to-business, business-to-customer, or customer-to-customer, the negotiations and transactions performed through intelligent agents will constitute an alternative to the traditional way of conducting transactions.

The platform 650 receives inputs from users (e.g., subscribers 600–602 and administrators 605, 610) via a user interface 705. In the case of business subscribers 710, input may also be received from specific applications or information systems. Specific outputs include the results of negotiations, database logs, messages sent to users (for example via e-mail, SMS, WAP, etc.).

In accordance with the example embodiment of the present invention, the interaction with the user is handled by the User Interface module (705), which uses the Application Program Interface of the web server (Netscape Server Application Program Interface (NSAPI) or Internet Server Application Program Interface (ISAPI), for example). The User Interface module gets the user's request, manipulates temporary data involved in HTTP or WAP request (which specify the actions to be executed and any associated parameters) and generates the appropriate XML streams or documents. These documents contain the information to be presented to the user (XML defines a way of structuring the information, without involving the presentation). In order to render the information in an appropriate form on the user device (computer, WAP phone, etc.), the XML documents are sent to an extensible style language (XSL) processor represented by the XSLProcessor module 706, together with the corresponding XSL files that were created for presentation purposes. The XSLProcessor outputs for example HTML pages (if the user device is an computer) or WML pages (if the user uses a WAP phone), which are sent back for presentation in a specific browser on the user device through the User Interface module.

The XSL processor XML streams or documents from the NSAPL(ISAPl) modules and outputs HTML pages or WAP pages based on the appropriate XSL files.

The database module 720 meets the negotiation environment's requirements for feeding and storing data. It can store and retrieve temporary or persistent data related to subscribers or negotiating agents (such as static profiles, agents' strategy configurations, values for offers and counter-offers in negotiation, negotiation results, data for online or offline statistics, inputs for and inferred results from knowledge-base systems integrated into the platform, etc.). The database module 720 may be, for example, an object oriented database management system or a relational one.

Corporate subscribers (buyers or sellers) may take into account private business rules when they conduct transactions with their partners. The business rule engine module 725 models this in the platform. For every business subscribing to the services provided by the negotiation platform, a different set of rules may be established. Each corporate subscriber may designate its own authorized person(s), e.g., business administrator 610, to establish and maintain its set of rules. The main component of the business rule engine 725 may be configured as an inference engine, which, together with sets of rules and the facts possibly extracted from the database 720 or received as inputs from other modules (including the negotiation engine 730), forms an expert system used in determining the negotiation strategies of the various corporate subscribers. The business rules may be used to articulate the behavior of the corporation's own delegated intelligent agents, and to control or validate their decisions in negotiation, i.e., the business rules may be used to configure an intelligent agent's negotiation strategy. For example, in accordance with business rules, an agent may be configured to negotiate certain terms based on: i) the time of day, ii) availability of resources, iii) concurrent negotiations, iv) physical location of a subscriber, etc. The business rules also may constrain a business administrator from inadvertently configuring an agent in certain manners. These business rules can thus be used by an agent in determining an initial offer or a counter offer. The interface to the business rule engine 725 and to other knowledge bases may be integrated into the general user interface 705 or may be a separate interface. Access to a particular business account's rule set is restricted to the authorized administrators of that business account.

The scalable software platform may be implemented using a variety of system architectures. For example, it may be distributed across many computers and may be extended with other modules. However, one important module of the platform, which should be present in any instance of such a platform, is the negotiation engine 730. The negotiation engine 730 implements the negotiation environment for the intelligent agents.

Negotiation Engine Module

The main components of the example negotiation environment are the intelligent agents with negotiation capabilities. The communication between agents during negotiation is made through a "marketplace" (or marketplaces, since more than one instance of this component may exist). The marketplaces and other components of the environment together play the role of a third party supervising the negotiation for efficiency and reliability. Other components of the environment handle the online visualization of the negotiation and load balancing among the platform's computers.

Figure 8:
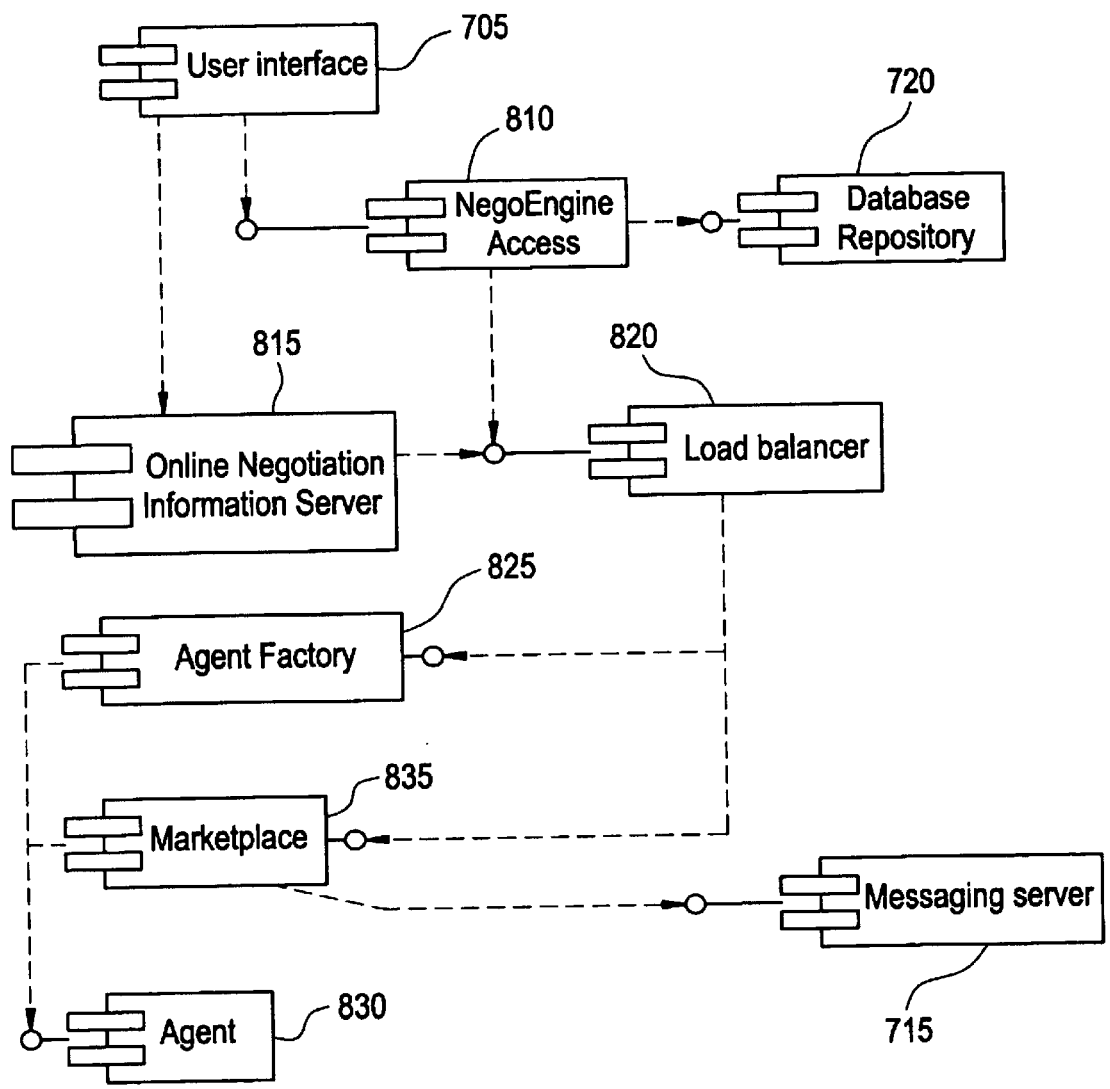
FIG. 8 is a unified modeling language component diagram of an example negotiation engine with its main components.

FIG. 8 shows a unified modeling language ("UML") component diagram of an example negotiation engine with its main components: NegoEngine Access 810, Online Negotiation Information Server 815, Load Balancer 820, Agent Factories 825, Seller Agents and Buyer Agents 830, and Marketplaces 835. The figure also shows other modules that are connected to the NegoEngine components. The NegoEngine main components are briefly described below.

NegoEngine Access 810 is the entry point into the negotiation environment. The user interface 705 contacts this module when a subscriber starts a new negotiation. The NegoEngine Access 810 searches the database 720 and gathers all the information (previously stored by the user interface 705) required to start the negotiation (including the agent and its opponents' behaviors). All this information is sent to the Load Balancer module 820 so it can launch the agent-creating process (if necessary) and start the multiple threads of the negotiation It is not necessary to create new agents every time a new negotiation starts. For example, business subscribers may want agents to stay in the market even after a negotiation is completed, so they can participate in negotiations with newcomers to the market.

The Online Negotiation Information Server 815 provides online dynamic data that reflects the evolution of different negotiations. These data are provided to an applet instance running in the browser windows of the users that request visualization of the progress of specific negotiation(s) in which their agents are involved. For a particular user, the applet instance sends requests to the Online Negotiation Information Server that specify a particular negotiation thread between his/her agent and a particular opponent agent selected by the user. This applet can render the data received from the Online Negotiation Information Server in a graphic and/or text form.

The Load Balancer module 820 provides better performance for the entire negotiation environment, by distributing the tasks on different physical machines, using a strategy that allows smooth control of the network and processor resources involved. Load Balancer 820 receives requests from the user interface module 705 to start new negotiation processes. If agents involved in negotiations do not yet exist, the Load Balancer 820 asks one of the Agent Factories 825 to create them, using the behaviors dictated by their owners and/or set by rules. To improve performance, the Load Balancer 820 may decide to move ah agent from one machine to another. For example, if all the other agents negotiating with a particular agent are running on a different machine, moving that agent to the other machine reduces network overhead. The Load Balancer 820 may run on a different physical machine than those of the Agent Factories 825 and Marketplaces 835. The communication between the components is performed transparently using, for example, CORBA technology.

The Negotiation Engine contains a number of Agent Factories 825, one for each Marketplace 835. The Agent Factories 825 are responsible for creating Seller and Buyer agents with the behaviors set by their owners. The agents created by an Agent Factory 825 may run on the same machine as the factory, but they may be involved in transactions with agents running on other machines. If necessary, the Agent Factory 825 responds to requests from the Load Balancer 820 to move a particular agent from one physical place to another to improve performance.

Agents 830 are the main elements that are involved in the negotiation process. They are able to take decisions by themselves in accordance with their established strategy. In accordance with the example embodiment of the present invention, there are two categories of agents: seller agents and buyer agents.

The Negotiation Engine is designed to support negotiation between multiple seller agents and multiple buyer agents. Multilateral negotiations are transformed into sets of separate bilateral negotiation threads. Each agent tries to maximize its assigned scoring function following a private strategy. This strategy defines the evolution in time of the agent's behavior in negotiation. The agent's behavior in negotiation and its modification during the course of the negotiations are under the user's control.

The Marketplace component 835 provides the environment in which the agents meet each other. This component supervises the communication between the parts that participate in negotiation. It acts as a mediator in negotiations between parties. The Marketplace 835 is also responsible for notifying the users, the agent owners, and the system about events that occur during the negotiation process. The messaging module 715 sends the actual notifications. In accordance with the example embodiment, the seller and buyer agents communicate with each other indirectly by means of the Marketplace 835 if they do not run on the same machine, CORBA calls are used.

The Marketplace 835 collects data on the progress of negotiations, and send it to the Database component 720. Some of this data may be retrieved later for profiling and statistics.

Configuring an Agent and Starting a Negotiation

In accordance with the example embodiment of the present invention, configuring an agent does not involve the Negotiation Engine. However, the Negotiation Engine module does use the configuration when the user who created the agent wants to start a negotiation. Simply put, configuring an agent means defining, in terms dictated by the user, the goal, constraints, strategy, and evaluation mechanism to use in negotiations.

Although many types of products or services may be available on the negotiation platform as subjects of negotiation, according to the example embodiment, the process of configuring a strategy for an agent is similar in all cases. The user uses functions to specify the behavior of its delegated agent in generating offers and counter-offers in negotiation. In other words, the functions are used, in every step of the negotiation, to generate values for the individual issues of the negotiation package. The functions can be selected from pre-defined templates, customized using an appropriately designed user interface, or defined from scratch.

The functions are dependent on various environmental parameters, such as deadline established for negotiation, the inventory level for a specific product, the number of opponents in the market, etc. The functions may be customized for each quantitative or qualitative attribute of the negotiation package and are defined so that the values they generate do not violate the domains of acceptability for the attributes. For each attribute a combination of functions may be defined. The relative importance of a function to the agent's behavior regarding a specific attribute is quantified through numerical weights. To model adaptive or more flexible behavior for the agents, or to better hide from other parties the strategy used in negotiation, the user may establish transition functions (depending on time or other parameters) that specify variations in these weights during negotiation. In addition, for business customers, the authorized administrator may model an adaptive behavior using business rules. The business rules may also be used to model more complicated strategies in negotiation, where the desired behavior for a specific attribute or component depends on the behavior for another component.

To evaluate the opponent's offers and its own offers during negotiations, the agent uses an appropriate evaluation mechanism included in its architecture. The agent uses this mechanism to decide if an opponent offer is acceptable; it takes into account a scoring or utility function assigned by the agent's owner. A goal of a delegated agent is to maximize its scoring function in negotiation. The scoring function may be modeled in various ways. A simple and natural way is to assign a scoring function for each of the elements of the negotiation package, and to model the overall scoring function as a linear combination of the elements' scoring functions. This kind of scoring system is provided by default. The contribution of each individual element score to the overall additive scoring function is quantified through the numerical weights assigned by the user. A score for a complex element that is not a simple attribute is computed taking into account the scoring of its sub-components (which at the lowest level are quantitative or qualitative attributes) and following the same additive model. Simple functions act as scoring functions for the attributes, which may increase or decrease monotonically. The user can specify whether an attribute should increase (i.e. the user wants to obtain a high value for it) or decrease. In addition to this default mechanism, the user may define his/her own scoring system by interactively customizing the scoring functions.

According to the example embodiment, regardless of the scoring system defined, the agent uses the same method to decide whether to accept an offer or to propose a new counter-offer during negotiation. When it receives an offer, the agent evaluates it, and then generates the counter-offer it intends to propose in accordance with its particular established strategy. The agent then evaluates the generated counter-offer. If the score of the received offer is greater or equal than the score of the offer it intend to propose, the agent may accept the offer and send an Accept message to the opponent agent. Otherwise, the agent proposes the new generated counter-offer. If the agent sent an Accept message and the next message received from the opponent is a Confirm message the deal is reached and the negotiation thread is successfully completed. The communication between agents is assured indirectly through a Marketplace component 835.

The user may configure his/her own agent using WAP (for a basic configuration) or HTTP (for a more advanced agent configuration). The configuration is sent to the User Interface which stores it in the Database. For business customers, authorized administrators may use the same interface, or may set up business rules using another interface.

Figure 9:
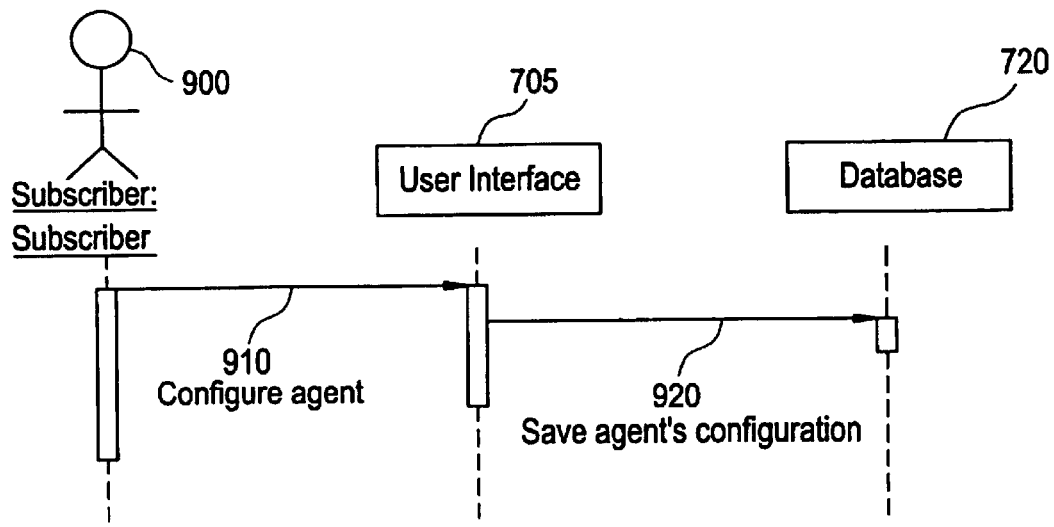
FIG. 9 is a UML sequence diagram showing the configuration of an agent.

FIG. 9 shows a UML sequence diagram showing the configuration of an agent. As shown, a subscriber 900 configures an agent (910) via the user interface 705. The configuration data is saved (920) in the database 720.

Figure 10:
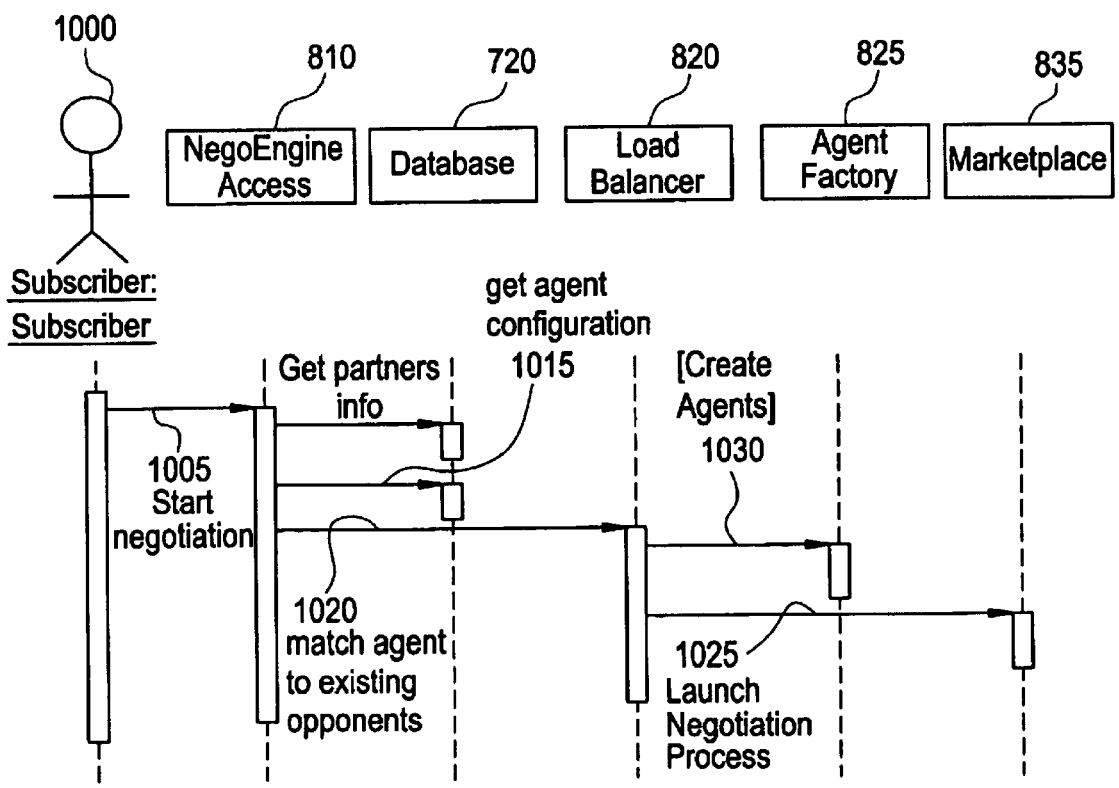
FIG. 10 is a UML sequence diagram showing the actors involved and the sequence of interactions beginning from the moment the subscriber gives the command to its configured agent to start a negotiation until the proper launching of the negotiation by the Load Balancer.

The UML sequence diagram in FIG. 10 shows the actors involved and the sequence of interactions beginning from the moment the subscriber gives the command to its configured agent to start a negotiation until the proper launching of the negotiation by the Load Balancer.

1. To start a negotiation 1005, a subscriber 1000 sends a request (via WAP or via HTTP) to the User Interface, specifying the agent to act on his/her behalf. The User Interface contacts the Negotiation Engine via the NegoEngine Access component 810.
2. The NegoEngine Access component 810 obtains from the Database 720 additional information (such as a predefined agent configuration 1015) and contacts the Load Balancer component 820 of the Negotiation Engine.
3. If the agents involved in negotiation are already instantiated, the agent is matched to an opponent 1020, and the negotiation process starts 1025. Otherwise the Load Balancer 820 chooses, according to its internal policy, the machine(s) where the missing agent(s) will be created 1030.
4. At this point, all the necessary elements to start a new negotiation are ready, and the Load Balancer 820 can launch the negotiation by selecting a Marketplace component 835 to supervise the negotiation process.

An agent configured and delegated by the subscriber negotiates in multiple threads. Each thread is a negotiation process between the respective agent and one opponent from the market. When events occur (such as an agreement or a network problem) the agents may notify their owners. However, the Marketplace component must also contact the Messaging module to send notifications to the owners.

Request Negotiation Thread Status

Figure 11:
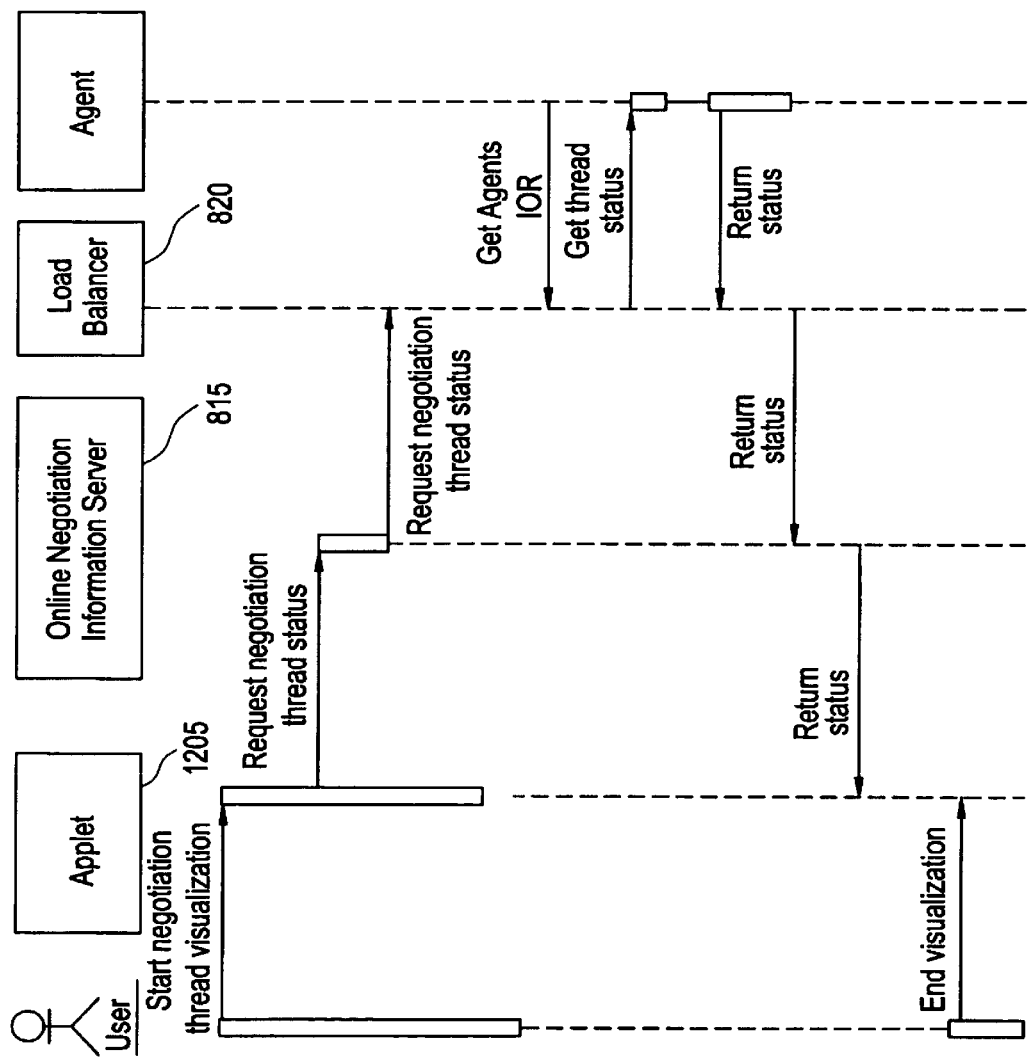
FIG. 11 shows the sequence of interactions when online information is requested.

FIG. 11 shows the sequence of interactions and the actors or main components involved when online information about a negotiation thread is requested. Online information about a negotiation thread where a specific agent (acting on behalf of a specific user for example) is involved, may be obtained through the Online Negotiation Information Server 815, which can be contacted via TCP/IP by an applet 1205 running on the client side (in a HTML browser for example) (1210, 1215). The Online Negotiation Information Server 815 contacts the Load Balancer 820 (via CORBA) and requests the status of the specified negotiation thread. The Load Balancer physically identifies (using its CORBA IOR-Interoperable Object Reference) the agent and asks it about the status of the specified negotiation thread. The agent's response is sent back on the same path till reaches the applet originating the request. By using such a procedure, for example, a user may obtain dynamic information in a graphical form related to the negotiation thread(s) in which one of his or her agents is involved.

The "Request Status" message may be sent periodically, so that the applet 1205 can present a stream of current data about agent status. The subscriber sees the evolution of negotiation between his/her agent and a selected opponent in graphical form.

The Inter-Agent Communication Language

Agents communicate with their partners via the Marketplace module, which takes the role of mediator.

As described above, a negotiation thread may be started by any party. The first party to send an offer may be chosen by the mediator, based on criteria such as the creation date of the agent—the newer agent might send the first offer.

Before starting the effective negotiation, a pre-negotiation stage may be necessary. The product or service package under negotiation has a set of issues that make part of a common ontology. The pre-negotiation stage may establish which issues must be part of any offer and which are optional. Other preparations or updates may be the object of this stage too, and are specific to each agent. For instance, previously established behavior, constraints, intervals of acceptability for offers, etc. may be updated at this stage, to take into account the particular partner or the overall negotiation strategy.

During the negotiations, each agent sends to its partner in a negotiation thread a packet containing the information that describes the object being negotiated (its request) and an action-type describing the action associated (e.g. "ask", "offer", "accept", "confirm").

The data that describes the packet in an offer or counteroffer with values for its embedded sub-objects and attributes must conform to an ontology known by both agents. An "action-type" field included in the packets exchanged between agents via the Marketplace forms part of the interaction language. The following table describes examples of allowed action types.

| Action Type | Meaning | Sent by | Sent when |
|---|---|---|---|
| Ask | A buyer asks for the object described in the packet (the packet contains an offer or counteroffer) | Buyer | The current offer was not accepted but the agent wishes to continue the negotiation |
| Offer | A seller wants to offer the object described in the packet (the packet contains new offer) | Seller | The last buyer Ask was not accepted but the seller wishes to continue the negotiation |
| Accept | An agent wants to accept the object proposed by its partner (the packet contains the offer) | Buyer or Seller | The utility of the object received is bigger than the utility desired at current moment |
| Confirm | An agent confirms that the accepted offer hasn't expired. | Buyer or Seller | An agent received an Accept message and still wants to buy/sell the product in the terms specified in previous step of then negotiation thread |
| Reject | An agent cannot confirm the offer or ask sent in the previous negotiation step. | Buyer or Seller | An agent received an Accept message but is internal policy has changed, so it will not confirm the previous request, but still wants to continue the negotiation thread |
| Exit | An agent decided to terminate the negotiation with the current partner | Buyer or Seller | The deadline expired, the buyer already bought the product from another seller, or the seller's stock is zero and the seller cannot continue negotiating or the agent has been stopped by the owner. |
| Syntax Error | An agent didn't understand the object description | Buyer or Seller | The ontology is not recognized by the agent |
| Semantic Error | An agent didn't follow the negotiation protocol (e.g., sent to Confirm afier an Ask) | Marketplace | The marketplace detects an inconsistency in the protocol |

| Action type | Meaning | Sent by | Sent when |
|---|---|---|---|
| Disconnect | The communication between marketplace and an agent was interrupted | Marketplace | The marketplace detects that one of the agents involved in negotiation was disconnected (network failure) |
| No operation | Do nothing | Buyer or Seller | An agent decided to skip for one negotiation step the communication with its partner |

While the present invention has been particularly shown and described with reference to example embodiments thereof, it will be understood by those skilled in the art that various changes in form and details may be made therein without departing from the spirit and scope of the invention.

What is claimed is:

1. An intelligent agent having a negotiation object comprising:
    at least one first sub-object associated with the negotiation object; and
    at least one second sub-object associated with the first sub-object, wherein a negotiation with the second sub-object is satisfied prior to entering negotiation with the first sub-object.

2. The intelligent agent as in claim 1, further comprising:
    at least one attribute associated with the first sub-object.

3. The intelligent agent as in claim 1, further comprising:
    at least one attribute associated with the second sub-object.

4. The intelligent agent as in claim 1, wherein the second sub-object and the first sub-object are in a hierarchical relationship.

5. A method of forming a negotiation object of an intelligent agent comprising:
    forming at least one first sub-object associated with the negotiation object; and
    forming at least one second sub-object associated with the first sub-object, wherein a
    negotiation with the second sub-object is satisfied prior to entering negotiation with the first sub-object.

6. The method as in claim 5, further comprising:
    forming at least one attribute associated with the first sub-object.

7. The method as in claim 5, further comprising:
    forming at least one attribute associated with the second sub-object.

8. The method as in claim 5, further comprising:
    forming the second sub-object and the first sub-object in a hierarchical relationship.

9. A computer accessible medium which when executed by a processor causes the processor to perform a method of forming a negotiation object of an intelligent agent comprising:
    forming at least one first sub-object associated with the negotiation object; and
    forming at least one second sub-object associated with the first sub-object, wherein a negotiation with the second sub-object is satisfied prior to entering negotiation with the first sub-object.

10. The computer accessible medium as in claim 9, further comprising:
    forming at least one attribute associated with the first sub-object.

11. The computer accessible medium as in claim 9, further comprising:
    at least one attribute associated with the second sub-object.

12. The computer accessible medium as in claim 9, further comprising:
    forming the second sub-object and the first sub-object in a hierarchical relationship.

* * * * *